BEST AVAILABLE COPY

M. MOSLER.

Assignor to THE MOSLER BANK SAFE COMPANY.

BURGLAR PROOF SAFE.

No. 11,219. Reissued Feb. 2, 1892.

Witnesses:
P. P. Sheehan.
A. Meyers.

Moses Mosler
Inventor:
by James N. See
attorney.

THE NORRIS PETERS CO., PHOTO-LITHO., WASHINGTON, D. C.

UNITED STATES PATENT OFFICE.

MOSES MOSLER, OF CINCINNATI, OHIO, ASSIGNOR TO THE MOSLER BANK SAFE COMPANY, OF SAME PLACE.

BURGLAR-PROOF SAFE.

SPECIFICATION forming part of Reissued Letters Patent No. 11,219, dated February 2, 1892.

Original No. 458,637, dated September 1, 1891; Reissue No. 11,204, dated November 24, 1891. Application for present reissue filed January 5, 1892. Serial No. 417,125.

*To all whom it may concern:*

Be it known that I, MOSES MOSLER, of Cincinnati, Hamilton county, Ohio, have invented certain new and useful Improvements in Burglar-Proof Safes and Vaults, of which the following is a specification.

This invention pertains to improvements in the construction of burglar-proof safes and vaults for the purpose of increasing the security to treasure provided by such safes and vaults and for the purpose of enhancing the facility for construction and alteration of such safes and vaults.

My improvements will be readily understood from the following description, taken in connection with the accompanying drawings, in which—

Figure 1:
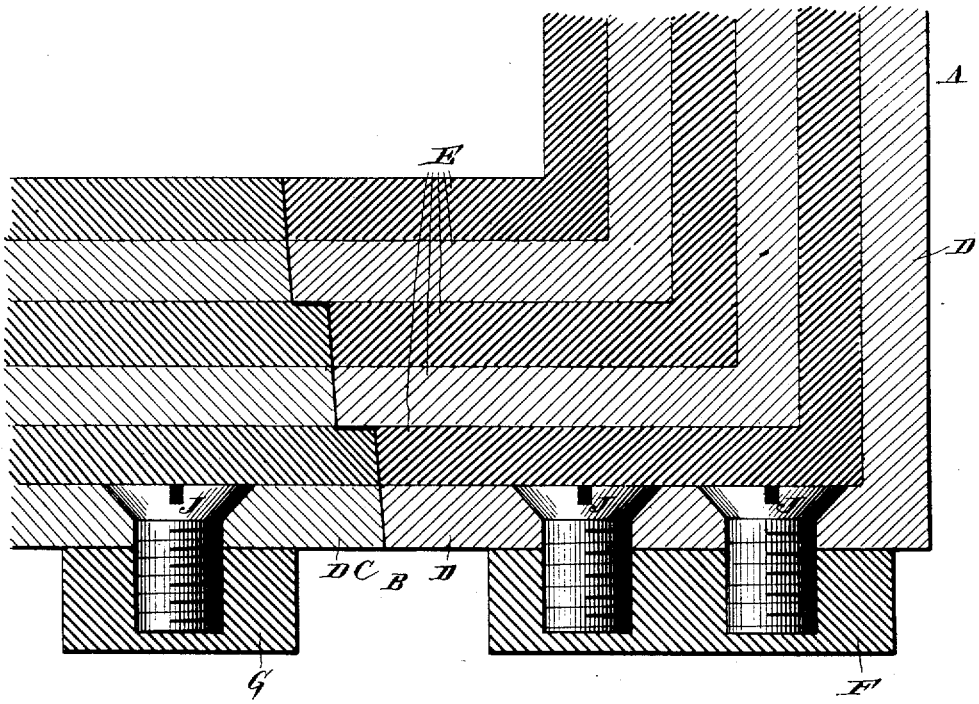
Figure 2:
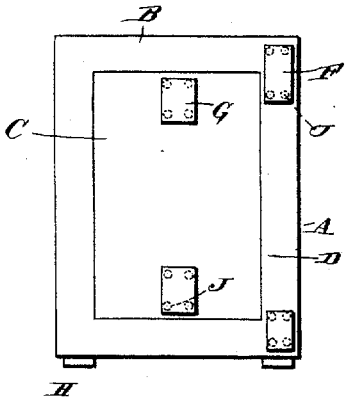

Figure 1 is a horizontal section through a portion of the walls of a burglar-proof safe, exemplifying my invention; and Fig. 2 a front elevation of a burglar-proof safe, minus legs and hinges, exemplifying my invention.

In the drawings, A indicates the body of a burglar-proof safe whose walls are formed in the usual manner of successive layers or plates of metal firmly united together; B, the front of the safe; C, the door of the safe, closing into rabbets in the front wall of the safe and having any of the usual forms—round, square, or otherwise—and also formed of layers or plates; D, the exterior plates of the safe and its door; E, the inner plates of the safe and door, comprising all of those disposed inwardly beyond the outer plates D; F, blocks or strips disposed against the outer face of the safe-front where hinges are to be attached; G, blocks or strips disposed against the exterior face of the door where hinge parts or other parts are to be attached to the door; H, blocks or strips disposed against the under surface of the safe where legs or rollers are to be attached, and J screws inserted outwardly from within the outer plates D and screwing into the blocks or strips upon the exterior of the safe.

The usual modern construction of burglar-proof safes is to build the walls of alternate layers of hard steel and soft iron, the hard steel to resist the drill and the tough iron to resist fr[illegible] If the outer surface of the safe be hard steel, then that layer will resist penetration and prevent the burglar from getting access to the space just behind that layer, and thus prevent him from introducing explosives into that space for the purpose of blowing off that layer and then attacking the next layer. Again, not being able to drill and tap the outer layer, he cannot screw forcing-screws through this outer layer to force the outer layer off by mechanical means. It would thus appear that a safe thus constructed could successfully resist attack made upon it by the burglar; but the door of a burglar-proof safe is a heavy affair and must be supported by massive hinges secured to the exterior of safe and door, and appliances must be attached to the exterior of the door, and often to the safe-front, to provide for operating the door, and it is also often desirable to attach legs or rollers underneath the safe. All these attachments must be made against the exterior of the safe and must be firmly made, and the consequence is that the exterior layer, on which so much of the security of the safe depends, must be provided with holes for the bolts by which such attachments are made. In other words, in ordinary construction of burglar-proof safes we have an exterior layer designed and constructed to resist the attempt of the burglar to penetrate to the space just behind that layer, and then, when all this is done, we have a series of screw-holes for attaching exterior parts leading directly to that space. Under such circumstances it will be readily seen that a monkey-wrench or screw-driver furnishes the burglar at once with means for silently reaching the space behind the outermost layer of the structure and thereby getting a start toward penetrating the safe. The holes referred to in the outer layer would permit the introduction of explosives to the space behind the layer if the explosive method of attack were employed; and if the mechanical method of attack were employed the screw-holes referred to would furnish the burglar with forcing screw-holes ready-made. Again, if the layer just behind the outer layer be of soft iron and the outer hard layer be thus provided ready made with holes through it, the burglar is at liberty to drill beyond these [illegible]

into the soft layer, and thereby readily penetrate to the rear of the second layer. Again, in the construction of burglar-proof safes formed of layers of plates the safe requires first to be constructed of unhardened material and then to be taken apart and the proper layers hardened and then to be put together again. All drilling and tapping in the outer layer to receive the attaching-screws must have been done while the safe was in its soft state, and after the parts are hardened and the safe rebuilt no change of location is practicable for the exterior attaching-screws, for the outer layer is hardened. The only way to alter the location of attaching-screws would be to take the safe to pieces and soften the hard outer plates. Again, the exterior attachments having all been necessarily fitted when the safe was first completed in its soft state, it often happens that the hardening process produces certain distortions which interfere with the accuracy of the exterior fittings. Again, the methods of door-hanging and of exterior fittings generally of burglar-proof safes are being constantly improved, and it is often desirable to provide a burglar-proof safe with modified exterior attachments. The hardened exterior layer seriously interferes and often prevents entirely the making of such changes at any reasonable expense.

In my improved construction the screws J, inserted from the inside of the outer layer, hold in place exterior iron blocks or strips, as at F, G, and H. When the parts are hardened and the safe put together, these blocks or strips form an integral part of the safe, and to them any desired exterior attachments may be made by drilling and tapping into them. The fitting of hinge parts, &c., may even be entirely omitted until the safe is rebuilt in its hardened form, for these blocks or strips are soft and may be surfaced or drilled into at will, and changes in fitting may be readily made in completed safes without the need for dealing with the hardened exterior plates. The burglar with his monkey-wrench may remove every exterior bolt which secures the outside fittings without opening the passageway to the space behind the hard exterior plate. He may, if he pleases, entirely cut away the soft patches or blocks; but still he gains no access to the vital space, the holes which contain the screws J being still filled by those screws, which may be of the usual tool-proof construction.

I claim as my invention—

In a burglar-proof safe, the combination, substantially as set forth, of a safe constructed of united layers of metal, blocks or strips of metal disposed against the exterior of the safe to receive exterior attachments, and screws inserted from within and projecting outwardly from the exterior of the safe and engaging said blocks or strips.

MOSES MOSLER.

Witnesses:
E. A. GLAESE,
FRED GRAESER.